(12) United States Patent
Bernaski et al.

(10) Patent No.: US 7,398,218 B1
(45) Date of Patent: Jul. 8, 2008

(54) INSURANCE PATTERN ANALYSIS

(75) Inventors: Michael J. Bernaski, Eden Prairie, MN (US); Jerome J. Albright, Boston, MA (US); Nancy J. Davis, New York, NY (US); Michael R. Krans, Denver, CO (US); Kara J. DeVoie, Willbraham, MA (US); Eric W. Thompson, Westfield, MA (US); John G. Freeland, Longboat Key, FL (US); Rainer M. Famulla, McLean, VA (US); James R. Bolton, Chicago, IL (US)

(73) Assignee: Accenture LLP, San Jose, CA (US)

( * ) Notice: Subject to any disclaimer, the term of this patent is extended or adjusted under 35 U.S.C. 154(b) by 765 days.

(21) Appl. No.: 09/649,766

(22) Filed: Aug. 28, 2000

Related U.S. Application Data

(60) Provisional application No. 60/151,068, filed on Aug. 27, 1999.

(51) Int. Cl.
*A61B 5/00* (2006.01)

(52) U.S. Cl. .............................................. 705/3; 705/4

(58) Field of Classification Search ................. 705/2–4, 705/10, 37, 80
See application file for complete search history.

(56) References Cited

U.S. PATENT DOCUMENTS

| | | | | |
|---|---|---|---|---|
| 4,796,181 A | | 1/1989 | Wiedemer ................... | 364/406 |
| 4,975,840 A | * | 12/1990 | DeTore et al. ................... | 705/4 |
| 5,093,794 A | | 3/1992 | Howie et al. ................. | 364/468 |
| 5,307,262 A | * | 4/1994 | Ertel .............................. | 705/2 |
| 5,557,515 A | | 9/1996 | Abbruzzese et al. ......... | 364/401 |
| 5,692,501 A | * | 12/1997 | Minturn ....................... | 600/301 |
| 5,809,478 A | * | 9/1998 | Greco et al. ................... | 705/4 |
| 5,870,711 A | | 2/1999 | Huffman ....................... | 705/8 |
| 5,950,169 A | | 9/1999 | Borghesi et al. ................ | 705/4 |
| 6,049,773 A | | 4/2000 | McCormack et al. .......... | 705/4 |
| 6,112,190 A | * | 8/2000 | Fletcher et al. ............... | 705/38 |
| 6,134,536 A | * | 10/2000 | Shepherd ...................... | 705/37 |
| 6,170,002 B1 | | 1/2001 | Ouchi ......................... | 709/206 |
| 6,223,164 B1 | * | 4/2001 | Seare et al. ..................... | 705/2 |
| 6,266,645 B1 | * | 7/2001 | Simpson ........................ | 705/3 |
| 6,272,482 B1 | | 8/2001 | McKee et al. ................. | 706/47 |
| 6,343,271 B1 | | 1/2002 | Peterson et al. ................ | 705/4 |
| 6,810,383 B1 | | 10/2004 | Loveland ....................... | 705/9 |
| 6,944,603 B2 | | 9/2005 | Bergan et al. ................. | 706/45 |

(Continued)

FOREIGN PATENT DOCUMENTS

WO WO 00/67182 11/2000

OTHER PUBLICATIONS

Proposals to admit corporate capital lift off (by Anonymous. Accountancy. London: Nov. 1993. vol. 112, Iss.1203; p. 57, 1 pgs).*

(Continued)

*Primary Examiner*—Vanel Frenel
(74) *Attorney, Agent, or Firm*—Brinks Hofer Gilson & Lione

(57) ABSTRACT

A method of determining risk includes comparing case data with a collection of profiles, selecting profiles from the collection of profiles, and aggregating the outcomes associated with the selected profiles to determine the risk associated with the case data.

48 Claims, 15 Drawing Sheets

U.S. PATENT DOCUMENTS

| | | | |
|---|---|---|---|
| 6,950,801 B2 | 9/2005 | Brookes et al. | 705/7 |
| 2002/0035488 A1 | 3/2002 | Aquila et al. | 705/4 |
| 2004/0225535 A1 | 11/2004 | Bond, Jr. et al. | 705/4 |
| 2006/0155622 A1 | 7/2006 | Laux | 705/35 |
| 2007/0100669 A1 | 5/2007 | Wargin et al. | 705/4 |

OTHER PUBLICATIONS

Anonymous. National Underwriter. (Property & Casualty /risk & benefits management ed.). Erlanger: Jun. 21, 1993. vol. 97, Iss.25; p. 47, 1 pgs.*

Accenture, "Accenture to Implement Claim Components Solution for OneBeacon Insurance," Jan. 2, 2002, New York, http://newsroom.accenture.com/article_print.cfm?article_id=3830 1 pg.

Falsey, Bill, "Promises of 'higher rates of return' miss the point," Mar. 20, 2005, Anchorage Daily News (Alaska), Ideas, p. K3, 1 pg.; https://w3.nexis.com/new/delivery/PrintDoc.do?fileSize-7509&jobHandle+1823%A275.

Georgakopoulos, D., Hornick M., Sheth, A., "An Overview of Workflow Management: From Process Modeling to Workflow Automation Infrastructure," Distributed and Parallel Databases 3, pp. 119-153 (1995), © 1995 Kluwer Academic Publishers, Boston, MA.

Irina, "Is Your Insurance Healthy," 2003, 4 pgs., http://aids.hallym.ac.kr/success/018/40152.html.

Jennings, C.A., "CRS Report for Congress - Sep. 11 Insurance Litigation," Jun. 14, 2002, Order Code RS21158, Congressional Research Service, The Library of Congress; 6 pgs.

McCall, N., Knickman, J., and Jones Bauer, E., "Grant Watch - Essay -Public/Private Partnerships: A New Approach to Long-Term Care," Health Affairs, Spring 1991, pp. 164-176.

Rayner, B., While the Industry Had Suuficient Funds Available to Handle the Sep. 11 Claims, Insurers Say They Must Raise Rates Now to Help Rebuild Capacity and to Adjust for Higher Levels of Risk.; High Anxiety; Terorism [sic], Rising Premiums Shake Commercial Insurance Markets; [City Edition];Feb. 4, 2002, Richmond Times-Dispatch, Richmond, VA., p. D16, 5 pgs.; http://proquest.umi.com/pdqweb?did=105429596&sid=1&Fmt=3&clientId=19649&RQT=309&VName=PQD.

Zhao, J.L., Stohr, E.A., "Temporal Workflow Management in a Claim Handling System," ACM SIGSOFT Software Engineering Notes, vol. 24, Iss. 2, pp. 1878-195, 1999 © 1999 ACM.

* cited by examiner

| Profile Number | Gradients | | | | Profile Outcome |
|---|---|---|---|---|---|
| | Type and Breadth of Business | Financial Performance | Quality of Management | Prior Insurance | |
| 1 | Superior, Excellent | Excellent, Good, Average | Excellent | Excellent, Good, Average, Poor | A1 |
| 2 | Superior, Excellent | Excellent | Good, Average | Excellent, Good, Average, Poor | A2 |
| 4 | Good, Average | Excellent, Good, Average | Excellent | Excellent, Good, Average, Poor | A2 |
| 7 | Good | Excellent | Good, Average | Excellent, Good, Average, Poor | A3 |
| 9 | Average | Excellent | Good | Excellent, Good, Average, Poor | A3 |
| 10 | Fair, Poor | Excellent, Good, Average | Excellent | Excellent, Good, Average, Poor | A3 |
| 11 | Superior | Good, Average | Fair | Excellent, Good, Average, Poor | B1 |
| 15 | Average | Good, Average | Good | Excellent, Good, Average, Poor | B1 |
| 16 | Fair, Poor | Excellent | Good | Excellent, Good, Average, Poor | B1 |
| 17 | Superior, Excellent | Poor | Excellent | Excellent, Good, Average | B2 |
| 18 | Excellent | Good, Average | Fair | Excellent, Good, Average | B2 |
| 22 | Fair | Good, Average | Good | Excellent, Good, Average, Poor | B2 |
| 23 | Poor | Good | Good | Excellent, Good, Average | B2 |
| 25 | Superior, Excellent | Excellent | Poor | Excellent, Good, Average | B3 |
| 28 | Excellent | Good, Average | Fair | Poor | B3 |
| 29 | Good, Average | Excellent | Fair | Excellent, Good, Average | B3 |
| 31 | Average | Excellent | Fair | Poor | B3 |
| 33 | Fair | Good, Average | Average | Excellent, Good, Average | B3 |
| 34 | Poor | Excellent | Average | Excellent, Good, Average | B3 |
| 36 | Superior, Excellent | Excellent | Poor | Excellent, Good, Average, Poor | B3 |
| 40 | Good | Excellent | Poor | Poor | C1 |
| 41 | Good, Average | Good, Average | Fair | Excellent, Good, Average | C1 |
| 46 | Fair | Poor | Excellent | Poor | C1 |
| 47 | Poor | Excellent | Fair | Excellent, Good, Average | C1 |
| 50 | Superior | Good, Average | Poor | Excellent, Good, Average | C1 |
| 52 | Excellent | Good | Poor | Poor | C2 |
| 53 | Good | Excellent | Poor | Excellent, Good, Average | C2 |
| 56 | Average | Excellent | Poor | Poor | C2 |
| 57 | Fair | Good, Average | Fair | Poor | C2 |
| 60 | Poor | Excellent | Fair | Excellent, Good, Average | C2 |
| 65 | Excellent | Good | Poor | Poor | C3 |
| 67 | Good, Average | Good, Average | Poor | Excellent, Good, Average | C3 |
| 69 | Average | Excellent | Poor | Poor | C3 |
| 70 | Fair | Good | Poor | Excellent, Good, Average | C3 |
| 73 | Poor | Excellent, Good, Average | Poor | Excellent, Good, Average | C3 |
| 79 | Superior, Excellent, Good, Average, Fair | Excellent, Average | Poor | Excellent, Good, Average | Unacceptable |
| 80 | Poor | Poor | Average | Poor | Unacceptable |

Fig. 15

INSURANCE PATTERN ANALYSIS

RELATED APPLICATIONS

The present application is based on provisional patent application control No. 60/151,068, entitled "INSURANCE EXCHANGE", filed Aug. 27, 1999, the contents of which are hereby incorporated by reference.

MICROFICHE REFERENCE

Two microfiche appendixes in the form of microfiche are included in this application that contain material which is subject to copyright protection. Appendix A contains 169 frames, and Appendix B contains 193 frames. The copyright owner has no objection to the facsimile reproduction by anyone of the Appendixes, as it appears in the Patent and Trademark Office patent files or records, but otherwise reserves all copyright rights whatsoever.

BACKGROUND

The present invention relates to systems that use rules and profiles to determine a score that can be correlated with a risk that an event will occur, for example automated underwriting systems that determine overall risk of loss, and to the integration of this type of system in sales and marketing, for example of insurance, loans, and credit cards.

Risk engines are automated systems or computer programs that return a risk factor or score based on data. In the context of insurance, a risk engine may be an underwriting computer program that will return a risk factor or score that correlates with a probability of loss for the insurer, based on facts about the insured person or property. The objective of underwriting is to ensure that a risk is placed in the proper rate plan/tier and that appropriate credits are given. Three alternative approaches are generally considered when automating an underwriting process: (1) scoring, a mathematical method that applies a numerical score based on specific attributes; (2) profiling, a scenario-based method that compares a collection of attributes to predefined scenarios, where each scenario has an associated score or risk; and (3) building a neural network, a form of artificial intelligence that develops its own model to make underwriting decisions by training.

Scoring methods are known, and are excellent predictors of performance. However, because each individual fact is scored independently, the final decision may be difficult to explain to customers, the method may be difficult to develop, and may be imprecise or inconsistent.

Neural network methods are also known, and are very precise and consistent. However, because the details of the underwriting decision are developed through training, the final decision is almost impossible to explain to customers. Furthermore, training may be complex and slow, and performance prediction may be unreliable.

Profiling methods are known as well, and in contrast to scoring methods and neural network methods, they are very precise and consistent, and excellent predictors of performance. Furthermore, the final decision reached through profiling is easy to explain to customers, since each result corresponds to a specific scenario.

Risk engines that use a profiling method to underwrite personal automobile and property insurance, are known. Since customers of personal automobile and property insurance fall into a rather small number of scenarios, a profiling method for underwriting this type of insurance need not be vary sophisticated, and is easy to develop with known profile building computer programs. A need exists, however, for a business owner policy (BOP) underwriting system. A BOP underwriting system needs to be much more sophisticated than personal automobile and property insurance underwriting systems, because a BOP insures business risk, property risk associated with each business location, and the general liability risk of each business location.

Risk engines for underwriting have been implemented in a commercial setting to provide very fast underwriting decision. For example, in one implementation, any agent telephones an underwriter, who then uses a risk engine to make a quick underwriting decision for a policy from one insurance provider. In another implementation, specific pre-selected insurance agents (captive agents) are given direct access to a risk engine via a private computer network, to make quick underwriting decisions from one insurance provider. There exists a need, however, for an implementation that will allow any agent, or even customers, direct access to a risk engine, for a quick underwriting decision for a policy from multiple insurance providers.

BRIEF SUMMARY

In a first aspect, the present invention is a method of determining risk, comprising comparing case data with a collection of profiles; selecting a plurality of profiles from the collection of profiles, where each profile is associated with an outcome; and aggregating the outcomes of the selected profiles to determine the risk associated with the case data.

In a second aspect, the present invention is a risk determining system, comprising a general- or special-purpose computer, a profile database connected to the computer, and a risk engine executed by the computer and connected to the profile database. The risk engine determines the underwriting risk of business owner policies.

In a third aspect, the present invention is a computer program product, comprising a computer-readable medium, means stored on the medium for comparing case data with a collection of profiles; means stored on the medium for selecting a plurality of profile from the collection of profiles, where each profile is associated with an outcome; and means stored on the medium for aggregating the outcomes of the selected profiles to determine a risk associated with the case data.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 15 shows a collection of profiles.

DETAILED DESCRIPTION

Although the following description and examples of the various aspects of the invention are presented in the context of selling and underwriting insurance, in particular commercial property and casualty lines, the invention is applicable to other business areas, for example the lending of money, credit card issuance, and insurance claim processing, as well as other types of insurance, such medical insurance, commercial automobile insurance, workers compensation insurance, professional liability insurance, umbrella liability insurance, recreational package insurance, and life insurance.

To apply a traditional profiling method to create a risk engine for a BOP, profiles associated with each separate part insured, such as the business risk, property risk associated with each business location, and the general liability risk associated with each business location, need to be aggregated together. This results in enormous and complex profiles (superprofile). Furthermore, the number of these superprofile needed becomes so numerous they cannot be handled efficiently.

The present invention includes a risk engine that does not aggregate profiles together to create a superprofile, but rather uses separate profiles for each part insured, and then aggregates the risk associated with these separate profiles to determine an overall risk. This results in fewer profiles that are stored and used for comparison, increasing the simplicity and efficiency as compared with traditional profiling.

Figure 3:
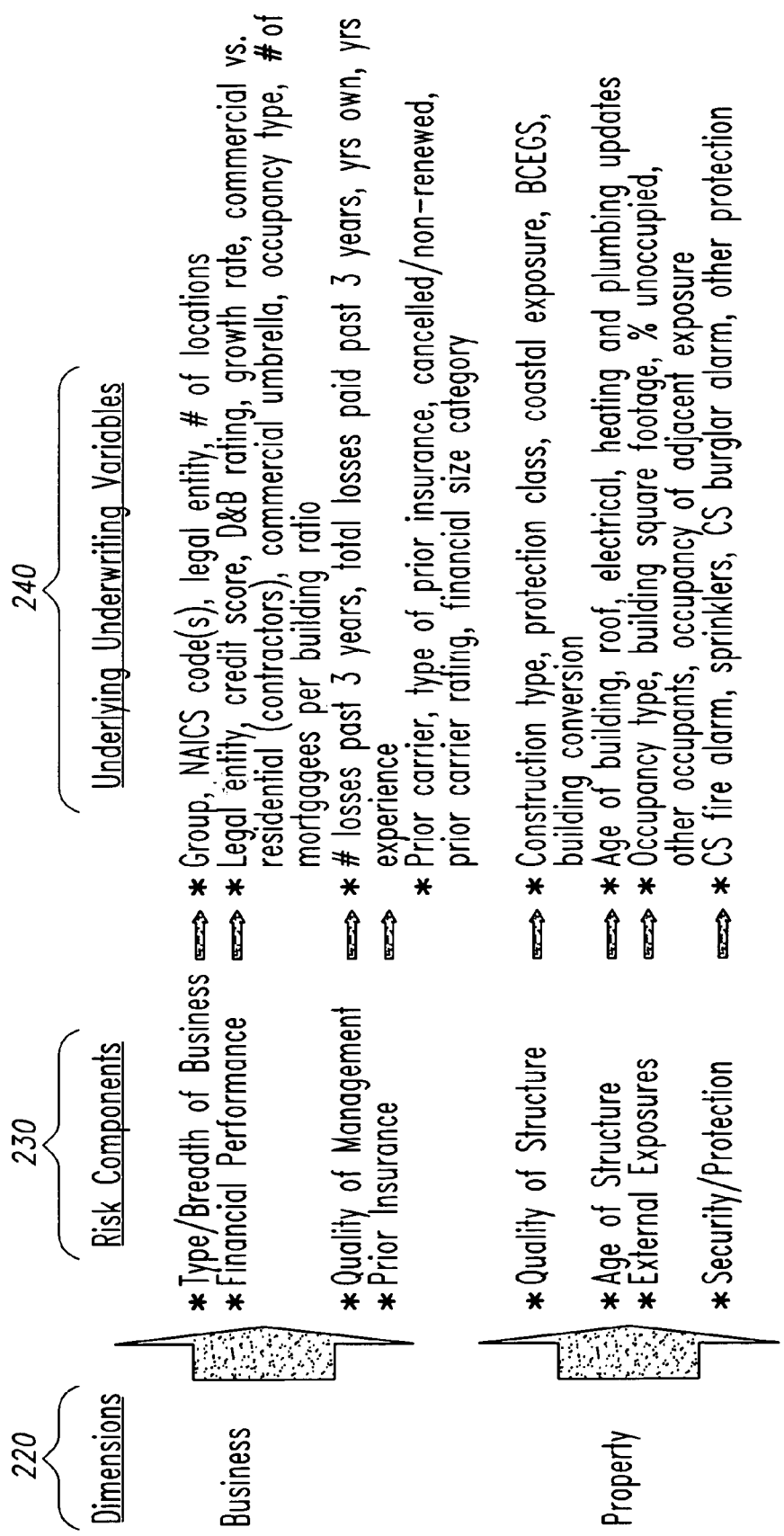
FIGS. 3 and 4 illustrates the hierarchy of dimensions, risk components and underwriting variables in a BOP.
Figure 4:
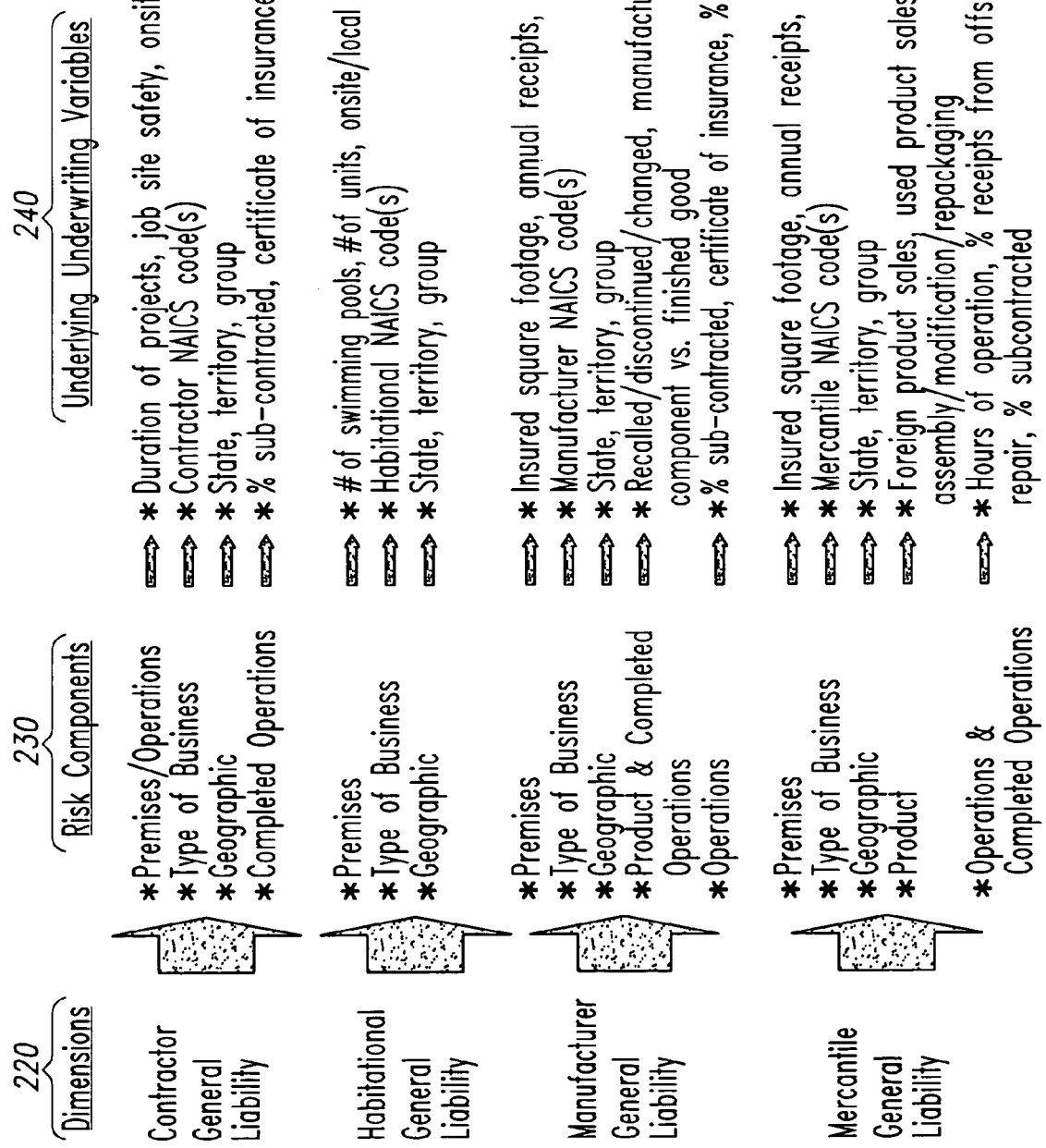

An insurance policy may include several insured parts, or dimensions, each of which may be classified into one or more classes of risk, the classes of risk are associated with one or more components, and the components are associated with one or more underlying underwriting variables. FIGS. 3 and 4 illustrate this hierarchy for a BOP. The classes of risk or dimensions 220 include business risk and property risk shown in FIG. 3; and different types of general liability risk are shown in FIG. 4. Each class of risk or dimension has components or risk components 230 associated with it, for example business risk is associated with type/breadth of business, financial performance, quality of management and prior insurance. Finally, each component or risk component will have associated with it one or more underlying underwriting variables 240, for example quality of management is associated with number of losses in the past three years, total losses paid in the past three years, years owned, and years of experience of the manager.

The underlying underwriting variables are the types of specific information that are used to ultimately arrive at the finally underwriting decision. For example, total losses paid in the past three years (an underlying underwriting variable) for a customer may be $20,000 (a factor or datum). The quality or gradient of each component will depend on the factors corresponding to the underlying underwriting variables associated with each component. The following tables list underlying underwriting variables for different risk components and the possible gradients for the risk components.

| BUSINESS RISK | |
|---|---|
| Underlying Underwriting Variables | Possible Gradient for Risk Component |
| Risk Component: Prior Insurance | |
| Prior Carrier | Excellent |
| Type of Prior Insurance | Good |
| Cancelled/Nonrenewed | Average |
| Prior Carrier Rating | Poor |
| Financial Size Category | |
| Risk Component: Quality of Management | |
| # Losses in Past 3 Yrs (Prior Carrier) | Excellent |
| Total Loses in Past 3 Yrs (Prior Carrier) | Good |
| Years Ownership | Average |
| Years Experience | Fair |
| | Poor |
| | Unacceptable |
| Risk Component: Type and Breadth of Business | |
| Group | Superior |
| NAICS Code(s) | Excellent |
| Legal Entity | Good |
| # of Locations | Average |
| | Fair |
| | Poor |
| Risk Component: Financial Performance | |
| Legal Entity | Excellent |
| Credit Score | Good |
| D&B Rating | Average |
| Growth Rate | Poor |
| Commercial vs. Residential | Unacceptable |
| Commercial Umbrella | |
| Occupancy Type | |
| # of Mortgages/Buildings Ratio | |

| PROPERTY RISK | |
|---|---|
| Underlying Underwriting Variables | Possible Gradient for Risk Component |
| Risk Component: Security/Protection | |
| CS Fire Alarm | Highly Prot. |
| Sprinklers | Protected |
| CS Burglar Alarm | Average |
| Other Protection | Minimal |
| | Unprotected |
| Risk Component: External Exposures | |
| Occupancy Type | Superior |
| Building Sq. Footage | Highly Desirable |
| % Unoccupied | Desirable |
| Other Occupants | Average |
| Occupancy of Adj. Exposure | Poor |
| | Unacceptable |
| Risk Component: Quality of Structure | |
| Construction Type | Highly Desirable |
| Protection Class | Desirable |
| Coastal Exposure | Average |
| BCEGS | Less Desirable |
| Building Conversion | Unacceptable |
| Risk Component: Age of Structure | |
| Age of Bldg. | New |
| Roof | Like New |
| Electrical | Middle Age |
| Heating | Old |
| Plumbing | Unacceptable |

-continued

| GENERAL LIABILITY RISK | |
|---|---|
| Underlying Underwriting Variables | Possible Gradient for Risk Component |
| Risk Component: Operations & Completed Operations | |
| Hours of Oper. | Superior |
| % Receipts from Offsite Installation, Service, or Repair | Good |
| % Sub-contracted | Average |
| | Below Average |
| | Poor |
| | Unacceptable |
| Risk Component: Product | |
| Foreign Product Sales | Good |
| Used Product Sales | Caution |
| Product Assembly/ Modification/Repackaging | |
| Risk Component: Geographic | |
| State | Good |
| Territory | Average |
| Group | Fair |
| | Poor |
| Risk Component: Type of Business | |
| NAICS Code(s) | Segment Values |
| Risk Component: Premises | |
| # of Swimming Pools | Low Traffic |
| # of Units | Average Traffic |
| Insured Square Footage | High Traffic |
| Annual Receipt | Unacceptable |
| Onsite/Local Property Manager | Highly Desirable |
| Adjacent Exposure | Desirable |
| Parking Lot Square Footage | Average |
| | Less Desirable |
| | Undesirable |

Figure 5:
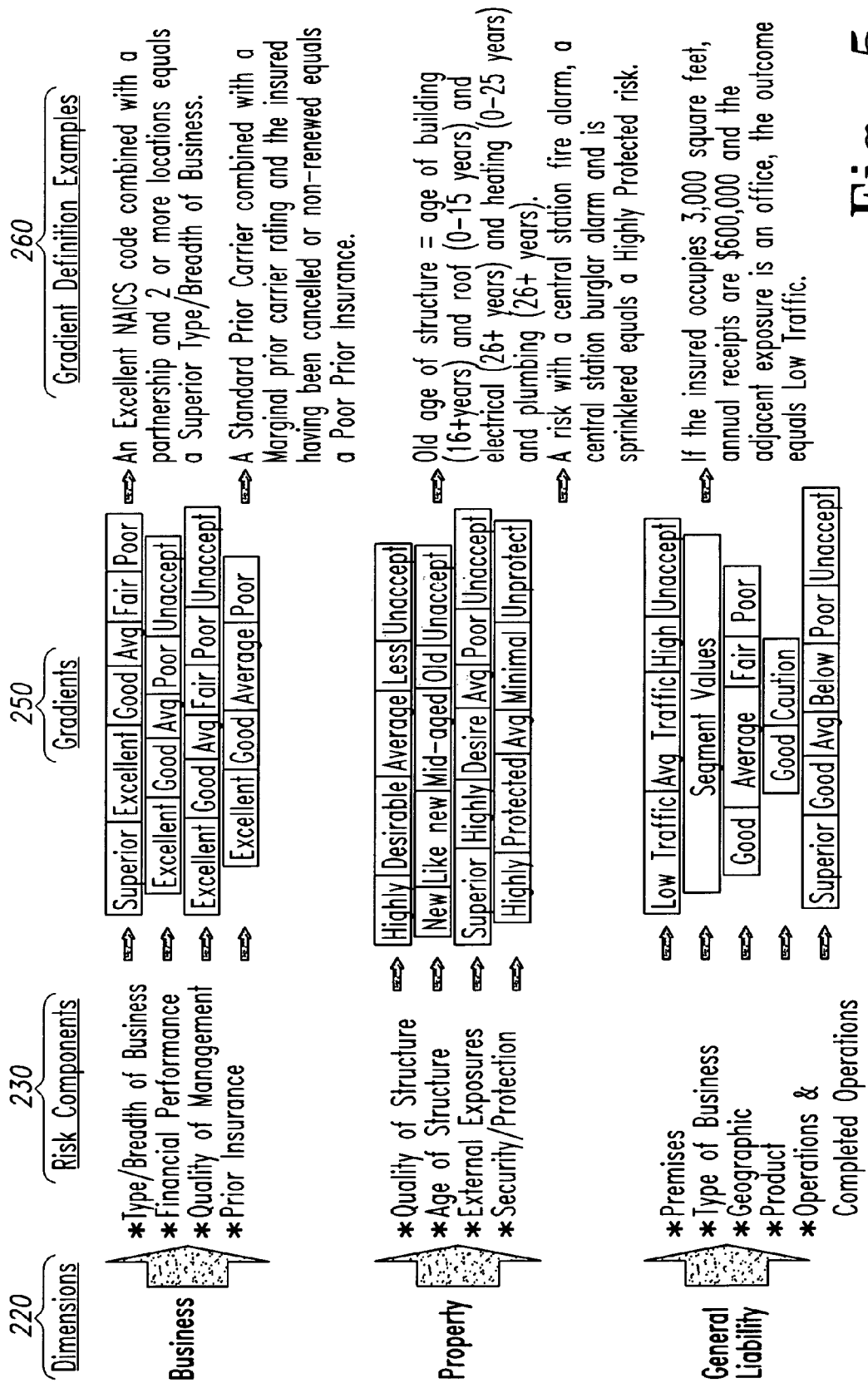
FIG. 5 illustrates gradients and example gradient definitions.

The gradient of a risk component is determined from the factors corresponding to underlying underwriting variables associated with the risk component, using the gradient definition for each possible gradient of a risk 5 component. FIG. 5 shows the possible gradients 250 for various risk components 230, and an exemplary gradient definition 260.

Figure 6:
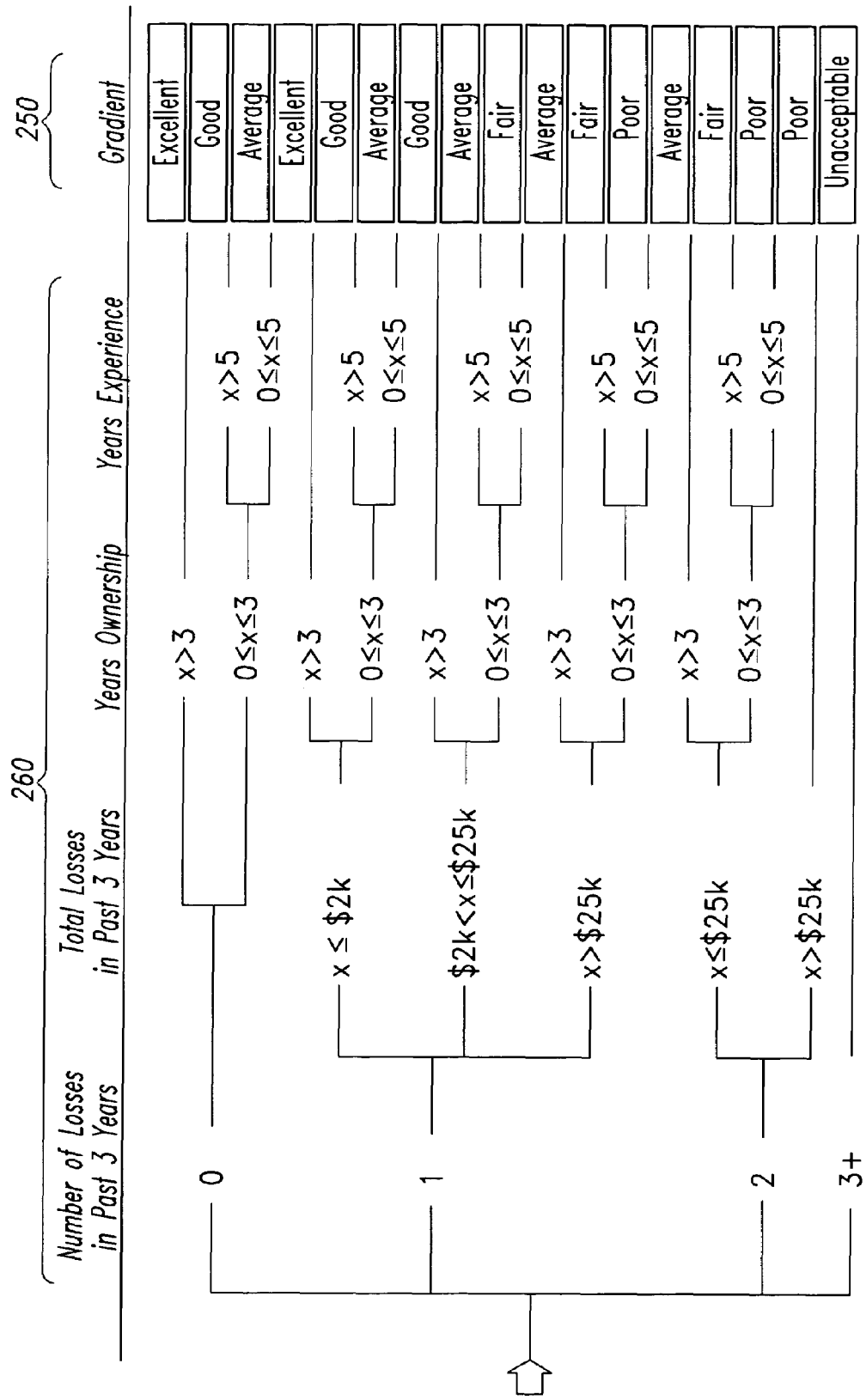
FIGS. 6-8 are decision trees used to determine gradient definitions.
Figure 7:
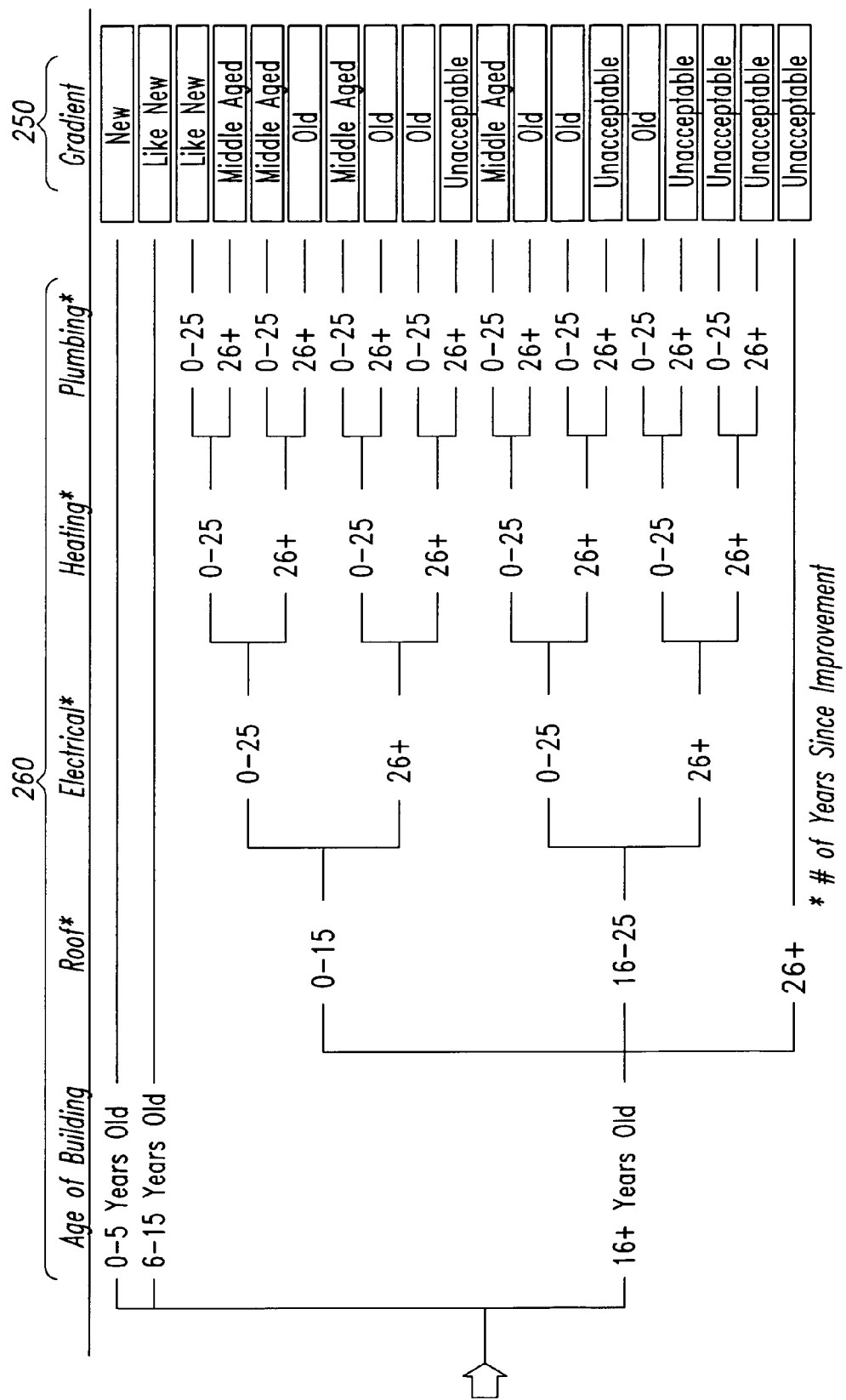
Figure 8:
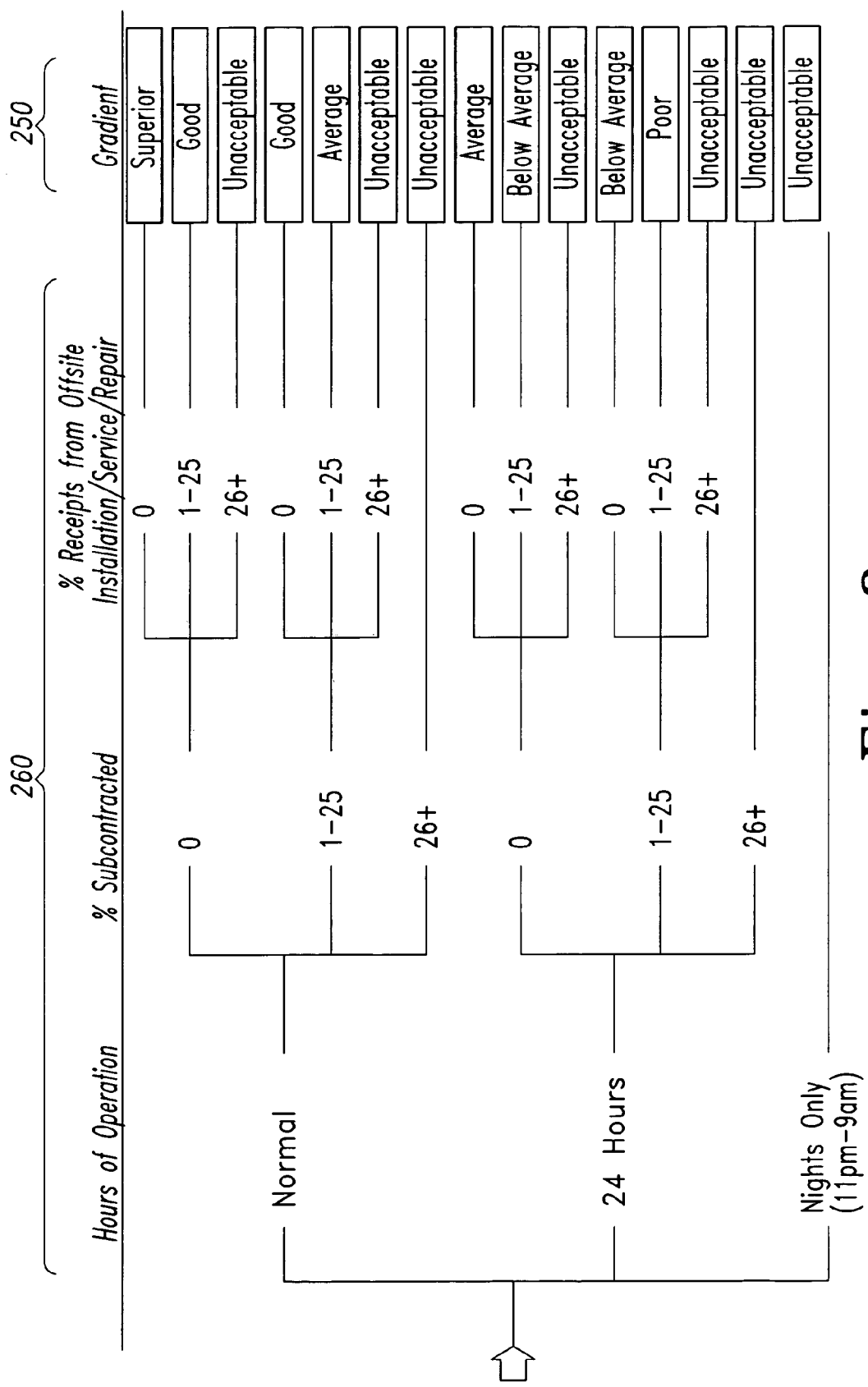

FIGS. 6-8 are decision trees used to determine gradient definitions 260 and the corresponding gradients 250. Factors are used to determine characteristics, the characteristics being branches of the decision trees. For example, in FIG. 6, a characteristic would be 3+ losses in the past three years, or $2,000 to $25,000 in total losses in the past three years. A single factor may define one or more characteristics, or more than one factor may be used to determine a single characteristic, with each characteristic being true or false.

Figure 9:
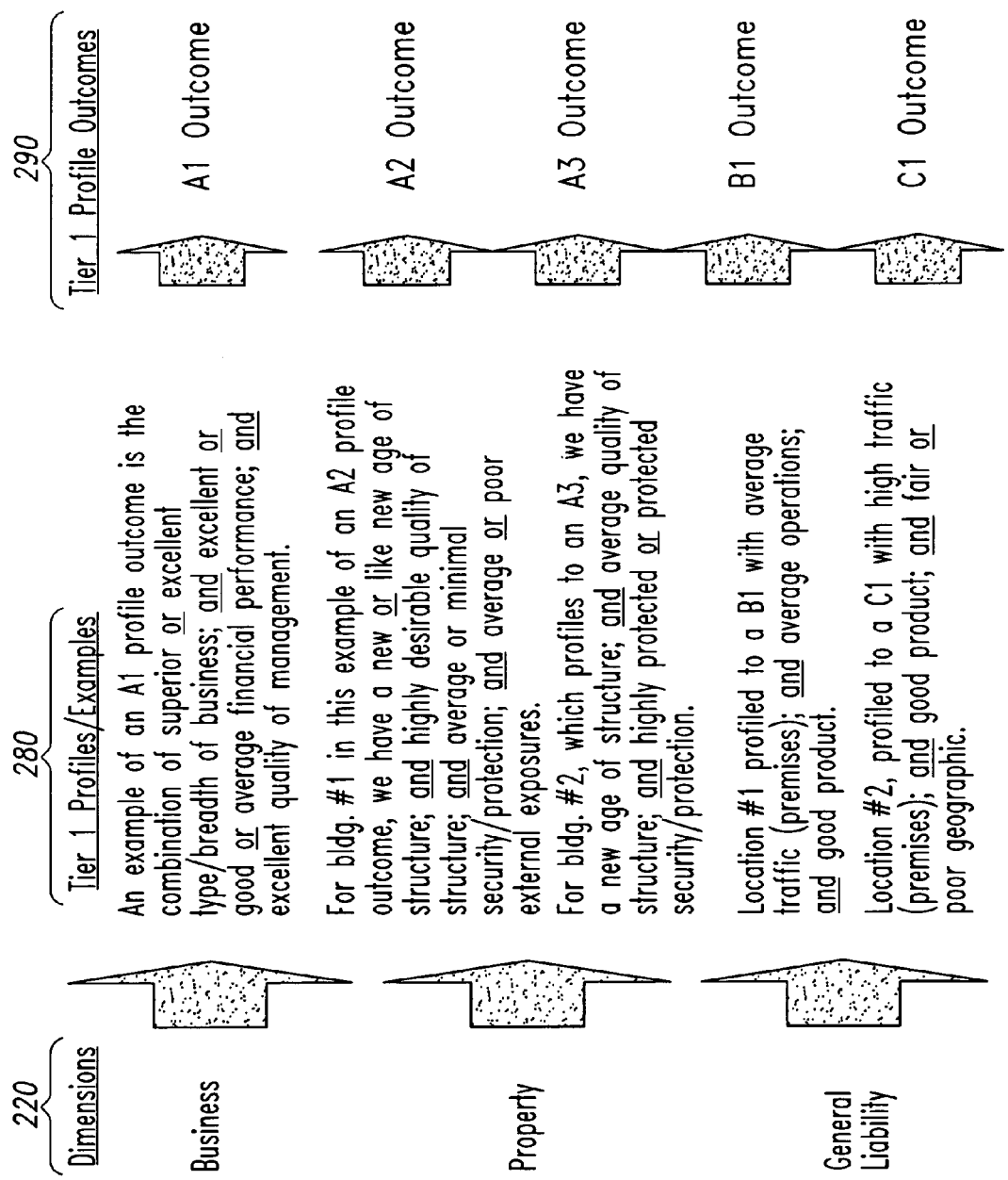
FIG. 9 shows examples of tier 1 profiles.

FIG. 9 shows examples of tier 1 profiles 280 that relate to different dimensions 220, and the tier 1 profile outcomes 290, associated with the exemplary profiles. In this figure, the example includes multiple parts in the dimensions of property and generally liability, in this case, multiple buildings and multiple locations, respectively. Each part will have its own tier 1 profile outcome.

Figure 10:
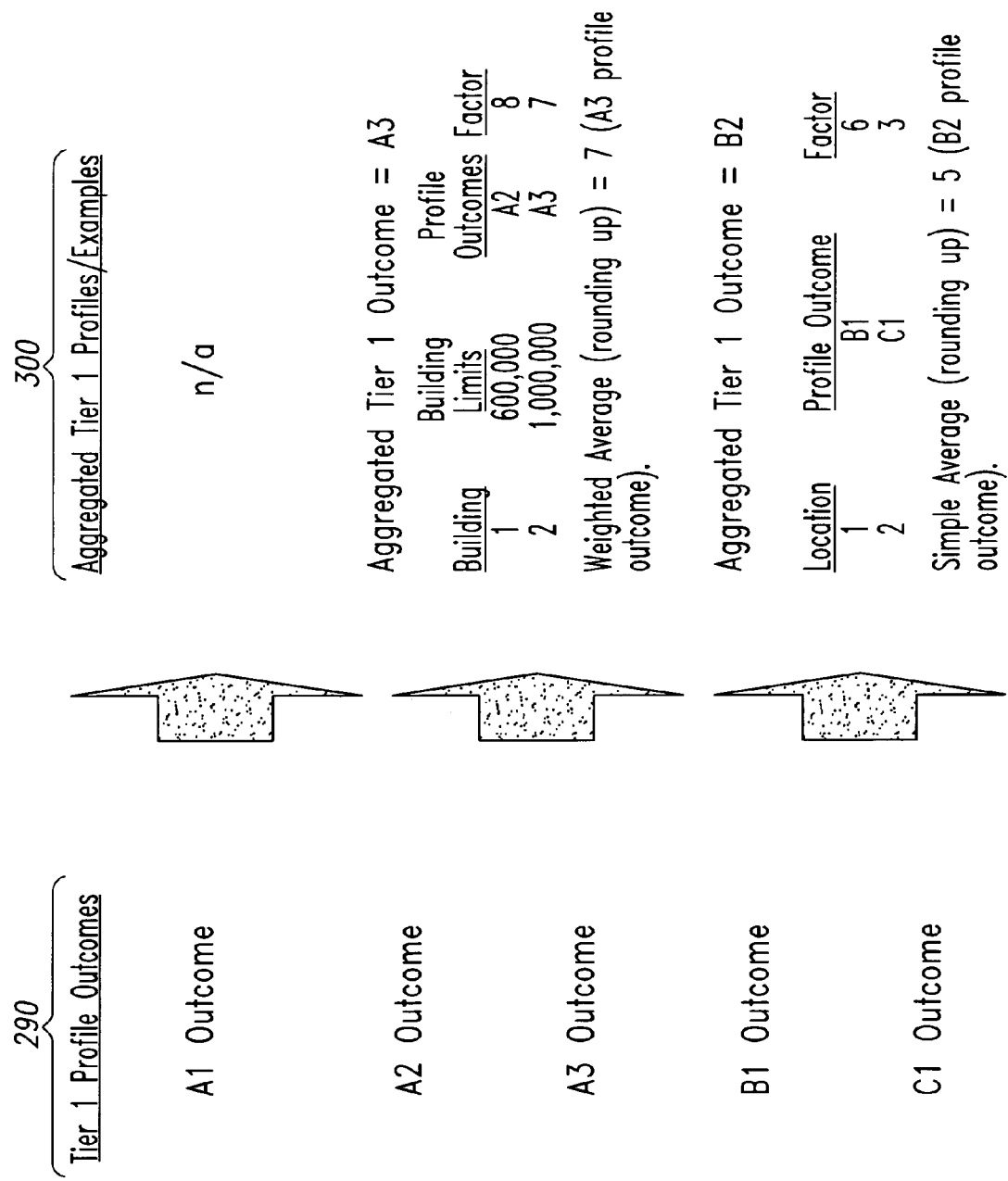
FIG. 10 illustrates aggregation of tier 1 profile outcomes.
Figure 11:
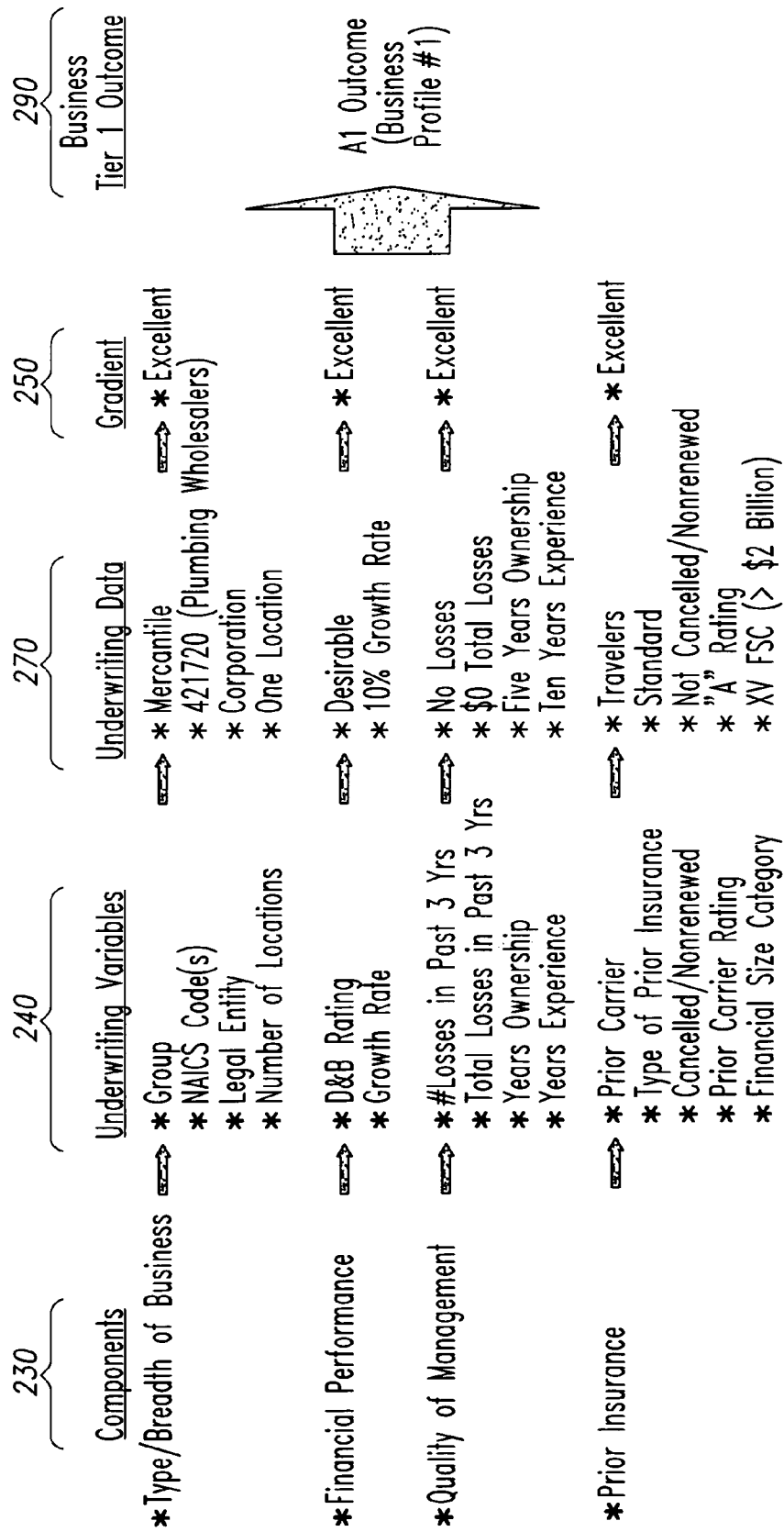
FIGS. 11-13 show a specific example of a BOP risk determination.
Figure 12:
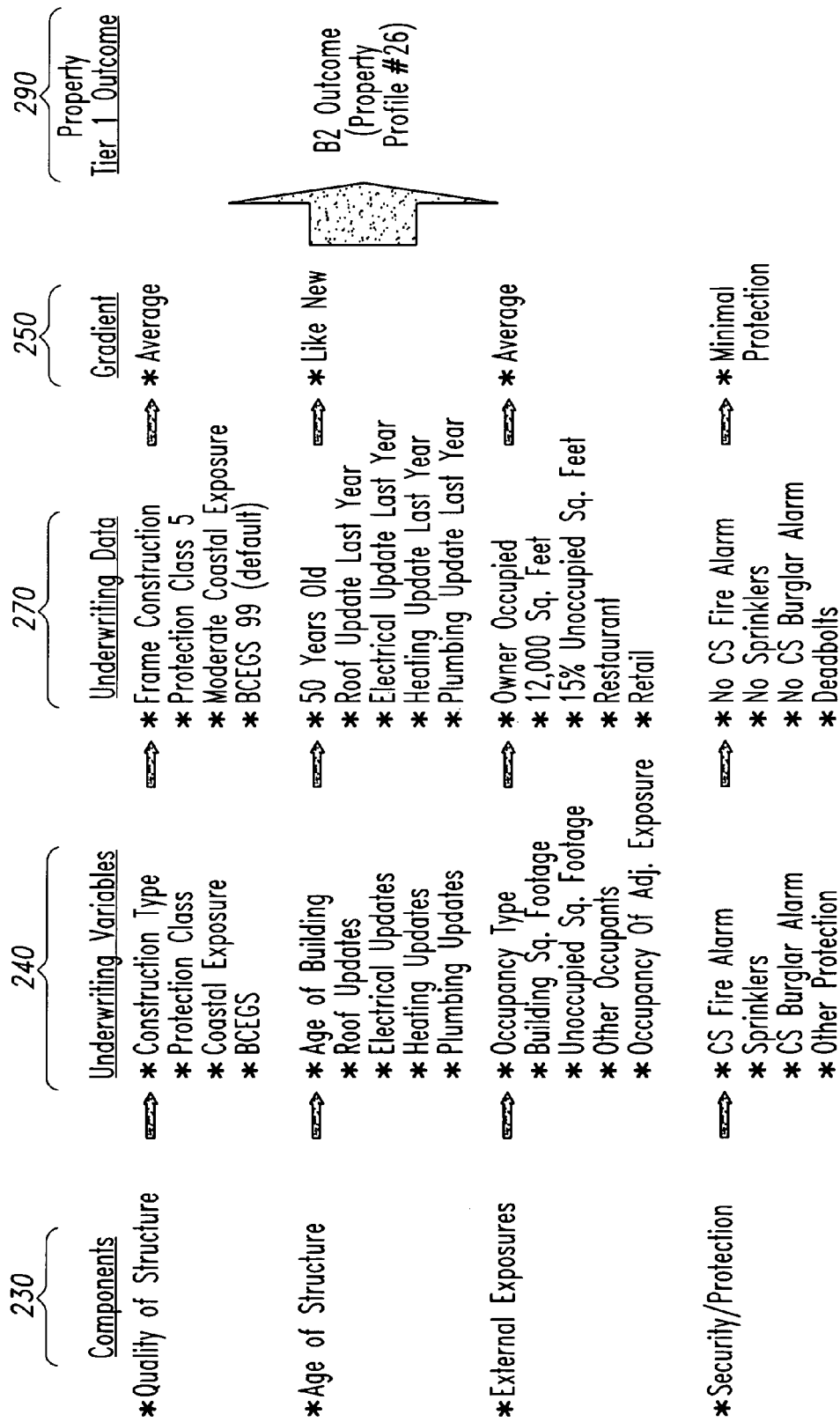
Figure 13:
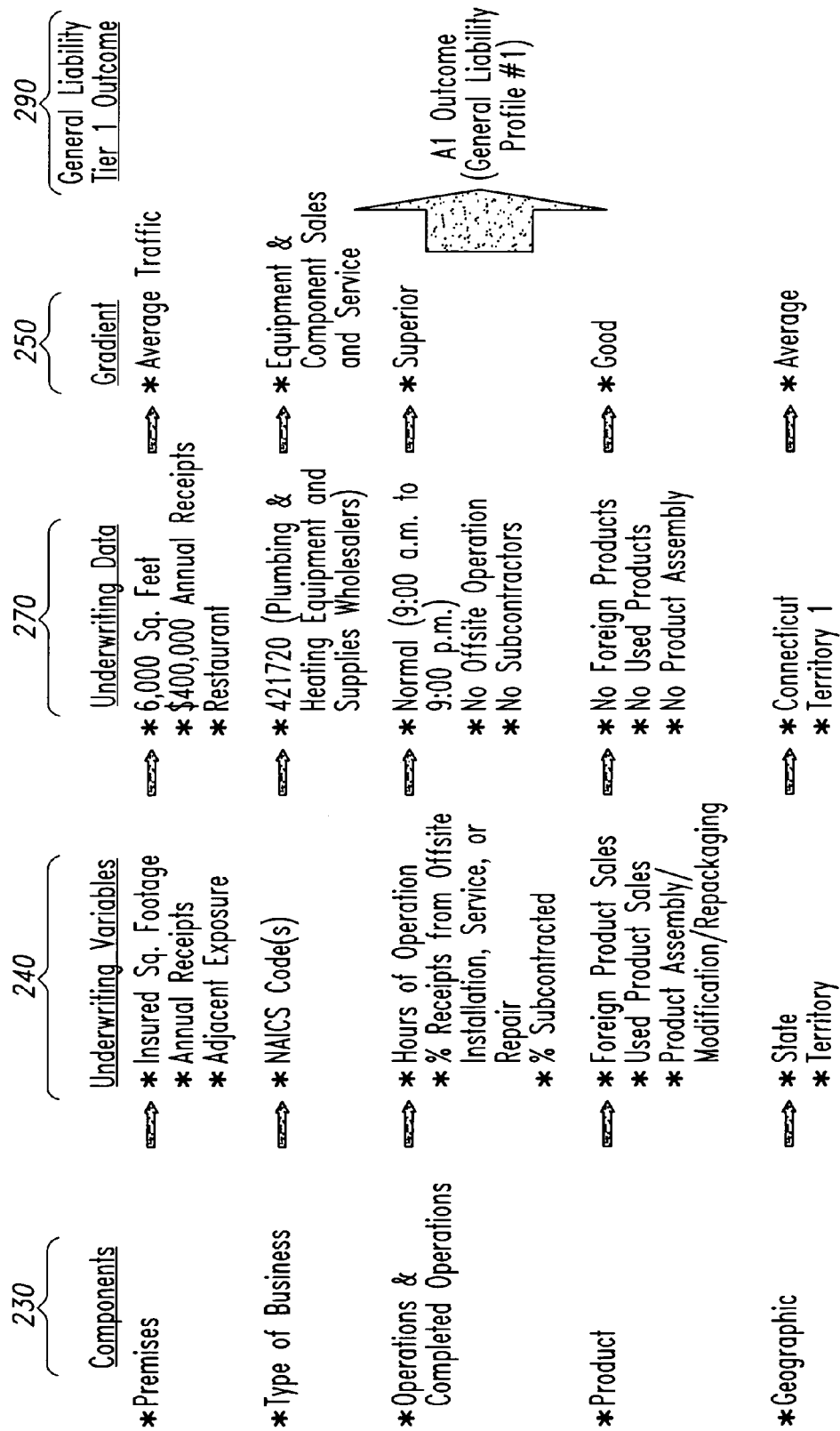
Figure 14:
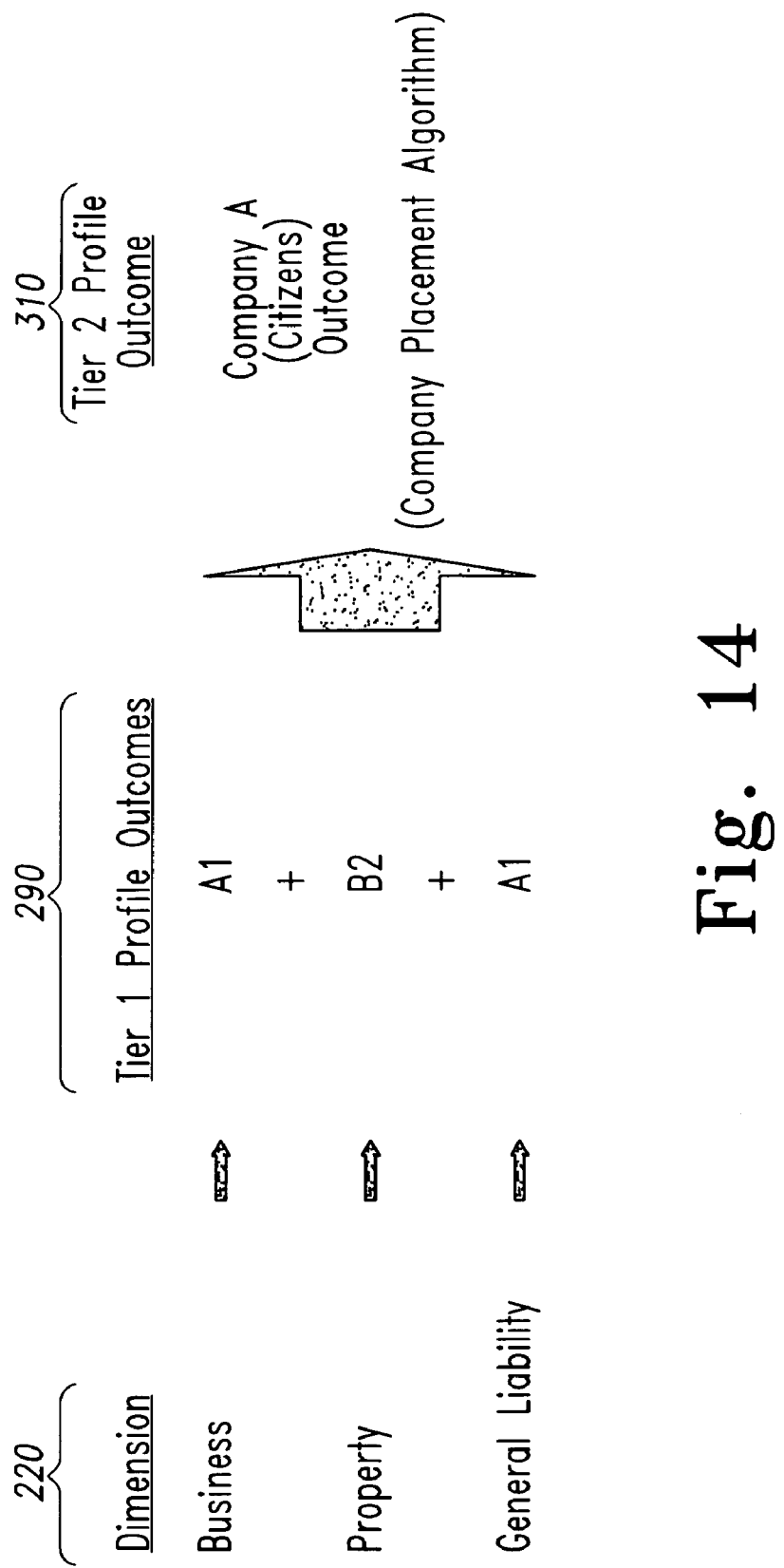
FIG. 14 illustrates aggregation of tier 1 profile outcomes.

When multiple parts are present for any of the dimensions, the individual tier 1 profile outcomes 290 are aggregated by dimension to give aggregated tier 1 profile outcomes 300, as shown in FIG. 10. Finally, the aggregated tier 1 profile outcomes, and any tier 1 profile outcomes for dimensions having only a single part, are aggregated together to form tier 2 profile outcomes 310 (not illustrated). FIGS. 11-13 provide a specific example starting with components 230 and underlying underwriting variable 240, then the specific factors or data 270 of this example, the corresponding gradient 250, and the corresponding tier 1 outcomes 290. In FIG. 14, the specific tier 1 profile outcomes 290 are aggregated into tier 2 profile outcomes 310. No aggregated tier 1 profile outcomes are shown because each dimension has only a single part in this example. Finally, FIG. 15 shows a collection of profiles 280, each profile having a specific gradient 250 associated with each risk component 230 and a corresponding tier 1 profile outcome 290.

The description of FIGS. 3-15 uses functional profile terminology, i.e. the terminology used by underwriters. Once the profiles are defined in this way, they need to be mapped into a structure that can be processed by a profile-based knowledge-based system, i.e. a technical profile structure. The examples used in the following description of technical profile structure chosen from automobile insurance, and can be similarly applied to other areas, for example a BOP.

In the technical profile structure, a profile is a segmentation of risk that is used in underwriting to slot risks and fine-tune the rating process. Profiles are assembled through the selection of zero or more of each of the following: characteristics, collective characteristics and collective-collective characteristics. When referring generically to any of the items that can make up a profile (i.e., characteristics, collective characteristics and/or collective-collective characteristics), the term "profile elements" is used.

A collective characteristic is characteristics combined into and/or relationships. A collective characteristic contains one or more combinations of characteristics which are "or"ed together. Each combination can contain one or more characteristic. For example, a collective characteristic might be "good personal stability" and might contain the following combinations:

Combination 1: Age over 40; or
Combination 2: Age over 30 and married and at the same job >3 years; or
Combination 3: Age over 20 and owns home.

In this example, the collective characteristic "good personal stability" would be considered true if any of the three scenarios (combinations) are true. The benefit of using collective characteristics is twofold—(1) allowing the underwriters to manipulate characteristics into and/or relationships, and (2) capturing commonly-used groups of characteristics into reusable elements. Combinations of characteristics are not reusable building blocks because if two collective characteristics utilize exactly the same combination, the combination actually has to be built twice, within the context of the appropriate collective characteristic.

To summarize, the rules surrounding collective characteristics are as follows: collective characteristics are formed by including one or more combinations of characteristics together; characteristics within the combinations are "and"ed together, except when the characteristics are from the same characteristic category (as described below); and combinations of characteristics are "or"ed together.

A collective-collective characteristic is a structure which allows collective characteristics and/or characteristics to be combined together, typically into 'and' relationships (an exception to this rule is described below). For example, a collective-collective characteristic for "good stability" might be formed by combining "good personal stability" and "good financial stability".

To summarize, the rules surrounding collective-collective characteristics are as follows: collective-collective characteristics are formed by including one or more combinations of collective characteristics and/or characteristics together; and the collective characteristics and characteristics within a collective-collective characteristic will always be "and"ed together, except when any of the collective characteristics are from the same collective category or when any of the characteristics are from the same characteristic category (as described below).

A collective category is somewhat analogous to a functional profile component in that it allows for categorization of collective characteristics and collective-collective characteristics into functional groups. Examples might include driving record, stability, prior insurance, etc. Although the collective category is a mechanism to allow classification, it also affects the definitions of profiles in that any two or more collective characteristics which are from the same collective category and are combined into either a collective-collective characteristic or into a profile will be evaluated together with an 'or' relationship. Likewise, any two or more collective-collective characteristics which are from the same collective category and are combined into a profile will be evaluated together with an 'or' relationship. Consider an example where the following are combined into a profile:

| Collective Category | Collective-Collective characteristic/Collective Characteristic |
|---|---|
| Stability | Good stability Marginal stability |
| Driving record | Clean driving record |

A profile consisting of the above items would read: "If (Good stability or Marginal stability) AND Clean driving record".

To summarize, the rules surrounding collective categories are as follows: collective characteristics and collective-collective characteristics are placed within collective categories when defined; if any two or more collective characteristics are from the same collective category and are used together to form either a collective-collective characteristic or a profile then the collective characteristics are "or"ed together; and If any two or more collective characteristics and/or collective-collective characteristics are from the same collective category and are used together to form a profile then the collective characteristics and/or the collective-collective characteristics are "or"ed together.

Gradients, depending on their complexity, will map to either collective-collective characteristics, collective characteristics or characteristics.

The definition of characteristic is consistent between the functional profile and technical profile definitions; characteristics are assessments that look at individual underwriting variables and compare them to thresholds/values. An example of a characteristic is "0 At-Fault Accidents in 3 Years."

A characteristic category allows characteristics that are constructed from the same factors, or data elements to be grouped together. Examples might include age, prior insurance type, vehicle performance type, minor violations, major violations, etc. Characteristic categories also affect the definitions of profiles in that any two or more characteristics which are from the same characteristic category and are combined into either a collective characteristic or collective-collective characteristic or into a profile will be evaluated together with an 'or' relationship. For example, if two age characteristics are 'very young' (ages 16 to 21) and 'young' (ages 22 to 26) and if these two characteristics are combined into a profile, then they would be evaluated as 'very young' OR 'young'.

To summarize, the rules surrounding characteristic categories are as follows: a characteristic belongs to a specific characteristic category; and if any two or more characteristics are from the same characteristic category and are used together to form either a collective characteristic or a collective-collective characteristic or a profile then the characteristics are "or"ed together.

Additional profiling functionality may be incorporated within a specific profile-based underwriting system. This functionality may be added to address specific issues or requirements, including the ability to create location-specific profiles, to track related profile elements which tie to the same gradient together, the ability to track different "versions" of profiles, the ability to indicate that a gradient must be met by any or all operators and/or any or all vehicles, and the ability to define profiles that ensure particular groups of characteristics are met for the same operator and/or vehicle.

Location-specific profiles allow the system to support transactions from multiple states; each state may have unique underwriting requirements. Although states have different underwriting guidelines, most states adhere to "common", or similar, types of requirements. This system ensures that redundant storage of profiles and profile elements that are actually the same are minimized, but also allows the capability to tie together profiles which are "almost" the same with minor location differences.

To this end, characteristics, collective characteristics and collective-collective characteristics are defined independent of location. Each of the items are then placed in a general "pool" which will be available to each state for defining profiles. At the profile level, there is a field to indicate for which location the profile is applicable. This location could be "default" or may contain a specific location code (i.e., state or foreign location). The following are examples (for simplicity, each profile is referred to by a number, rather than a name):

Profile 101, which applies to all states. In this case, there would be one profile 101 and its location would be "default".

Profile 102, which has a default profile that applies to most states and two location-specific versions that apply to OH and IL, and does not apply to AL. In this case, there would be one profile 102 with a location of "default", one profile 102 with a location of OH, one profile 102 with a location of IL and one profile 102 with a location of AL. The profile 102 for AL would simply include no elements and, therefore, would never match any transactions.

Profile 103, which applies only to AL, OH and DE. In this case, there would be one profile 103 with a location of AL, one profile 103 with a location of OH and one profile with a location of DE. Note that in this case there would be no default profile.

If the above profiles were the only ones defined in the system and if an insurance application was received from each of the states listed below, the indicated profiles would be the only ones considered for evaluation:

NE: Profile 101-Default, Profile 102-Default
OH: Profile 101-Default, Profile 102-OH, Profile 103-OH
IL: Profile 101-Default, Profile 102-IL
AL: Profile 101-Default, Profile 103-AL
DE: Profile 101-Default, Profile 102-Default, Profile 103-DE This approach has the advantages of drastically reducing redundant storage of like profiles (Note: there will be duplicate storage if two or more locations override a default profile in exactly the same way); allowing all location versions of the same profile to be tracked together so that global performance can be determined (for example, all preferred company customers with good prior insurance, good. stability and good driving record); and allowing underwriters to tie functionally similar profiles together. If there is no link between like profiles across locations, then it is very difficult for underwriters to sift through profiles and identify the similar ones. This design also facilitates the modification process if a profile needs to be changed and the change needs to be made in all states that use that profile.

Using a common pool of profile elements, it is preferable that each element be precisely named to reflect its contents. For example, if there are two collective characteristics for Good Stability—one which includes credit in its definition and one which does not, then they would be named "good stability including credit" and "good stability excluding credit" or something similar.

Profile elements (e.g., characteristics, collective characteristics, collective-collective characteristics) are the only technical elements that are necessary to fully define profiles. For use in tracking (i.e., tying functionally related profile elements together) and for ease of navigation for business users, gradients may be stored within the system. Gradients may also be related to one or more profile elements which are known as "variants" of the gradient. For example, if a gradient is "good household driving record" and there are two collective characteristics which are used to indicate good household driving record (depending on state requirements)—"good household driving record considering no-fault accidents" and "good household driving record not considering no-fault accidents", then the two collective characteristics are variants of the gradient. If a user is building a new profile and wants to include "good household driving record", they would first choose the gradient and would then be prompted to select from the list of profile elements (in this case, collective characteristics), which are variants within the gradient. A gradient may tie to one variant or more than one variant, depending on the requirements of various locations. For example, if all locations use the same definition of "good stability", then there would only be one variant tied to the gradient.

Benefits to this approach include providing gradients as a useful navigation tool for underwriters to navigate to the "variants" they want to include in their profile; using gradients to tie variants together for tracking purposes (for example, there may be a need to tie all variants of good driving record together on a global basis and study the performance of these policies); and eliminating the need to store location-specific characteristics, collective characteristics, etc., which would add significant complexity to the system.

Making changes to any profile or profile element is preferably allowed, from a functional perspective, but has major implications to long-term tracking and audibility. Three different approaches are possible:

1. Enabling versioning for all profiles and profile elements
2. Not enabling versioning for profiles and profile elements
3. A hybrid approach—enabling versioning for profiles, but not profile elements Option 1. Versioning Enabled: In this alternative a "version number" is assigned to each profile and each profile element. When a significant change is desired, the item is terminated and a new "version" of the item is created. Multiple versions may have the same item id (e.g., profile id, characteristic id, etc.) to facilitate tracking. Versions may also have both a "start date" and a "stop date" to indicate what timeframes the item is applicable.

Option 2. No Versioning: In this option, neither profiles nor profile elements are versioned. Timeframes may still be associated with profiles, however, if a change is required to a profile or profile element, the item may be terminated (i.e., end date is set to the termination date) and a new item may be created with a different id. Any profiles or profile elements that previously included the terminated element may also be updated. For example, if a characteristic needs to be changed, it must first be terminated, then the new definition created, then all profiles, collective characteristics and collective-collective characteristics that included the original characteristic in their definition must now be updated to include the new characteristic id instead.

Option 3. Hybrid: This option combines the first and second approaches by enabling versioning for profiles, but not allowing versioning for the profile elements (e.g., characteristics, collective characteristics and collective-collective characteristics). This alternative still forces one to re-map affected profiles, collective characteristics and collective-collective characteristics if a characteristic needs to be revised.

When adding a gradient to a profile, the underwriter may need to specify whether the gradient must be matched for ANY operator or ALL operators and/or for ANY vehicle or ALL vehicles. This functionality is nicknamed "Any/All" and may be displayed with the gradients in a profile. For example, one profile may need to specify "Any car is a sports car", whereas another profile may need to specify "All cars are sports cars", depending on the profile's purpose.

A subtle point in the definitions of profiles is that in some cases, multiple characteristics should be met for the same operator (e.g., young, good driving record) or vehicle (e.g., high performance, sports car). This functionality may be accomplished by including these characteristics in either a collective characteristic or a collective-collective characteristic. When multiple characteristics that tie to operators or vehicles are included in a combination within a collective characteristic, the characteristics may be matched for the SAME operator or vehicle in order to consider the combination to be true (or met). Likewise, when multiple collective characteristics and/or characteristics which tie to operators or vehicles are included in a collective-collective characteristic, the collective characteristics and/or characteristics must be matched for the SAME operator or vehicle before the collective-collective characteristic is valid. For example, in the collective characteristic "experienced named insured", the two characteristics—named insured and experienced driver—must be met for the same operator in order for the collective to be met. If the same two characteristics were included directly into the profile, then if ANY operator were the primary operator and ANY operator were experienced, then they would be considered matched.

Another common issue is determining whether to evaluate profile elements if the elements are not part of the profile set being evaluated. For example, a "pool" of common characteristics etc. may or may not be in the scope of profiles at a point in time. Evaluating all profile elements allows the tracking of trends over time (and determining if some characteristics should be added to existing profiles), however there are performance implications when unused profile elements are evaluated. Optionally, there all characteristics may be evaluated, but only the collective characteristics and collective-collective characteristics for the profiles within scope.

Figure 1:
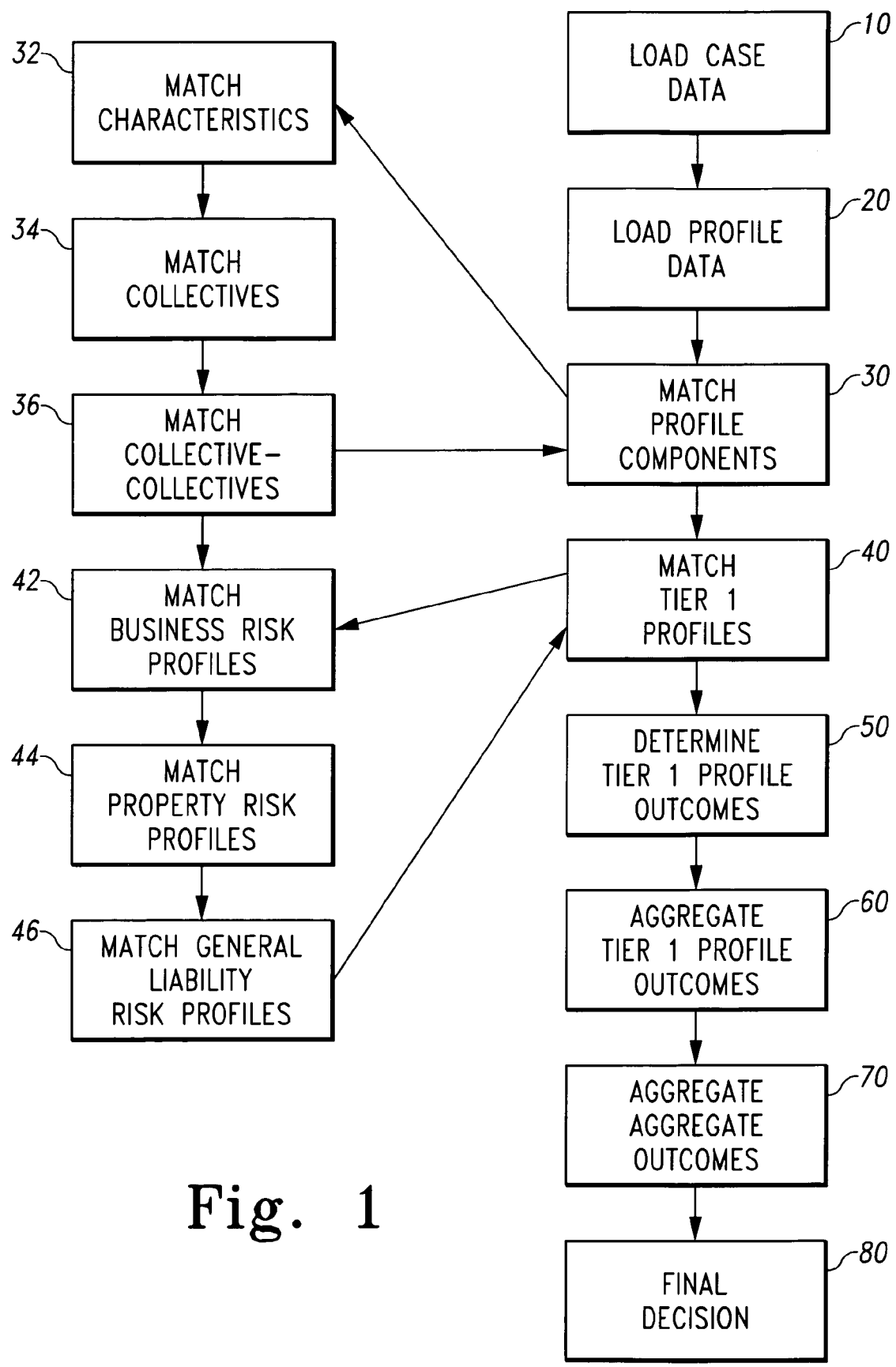
FIG. 1 is a flow chart of an embodiment of a risk engine of the present invention.

FIG. 1 is a flow chart of an embodiment of a risk engine of the present invention for BOP underwriting. The data of a specific case is first loaded 10. This data may have been collected by an agent in-person from a customer, and entered into the system via the internet or a private network, or alternatively the customer may enter this data direct via the internet, based on specific question posed from a website. Profile data is then loaded 20, from a profile database. Next, the components of the profile are matched 30 by first matching the data with characteristics 32, then matching the data and characteristics with collectives 34, and finally matching the data, characteristics and collectives with collective-collectives 36.

After the profile components are matched, the components are matched with profiles associated with each class of risk 40, in this example business risk, property risk, and general liability risk (tier 1 profiles). The components are match with profiles by matching the business risk profiles 42, matching the property risk profiles 44 and matching the general liability risk profiles 46. The different tier 1 profiles may be matched in any order, or even simultaneously.

Once the tier 1 profiles are determined, an outcome for each profile is determined 50, based on the specific profile matches. Next, the tier 1 profile outcomes for each class of risk are aggregated 60, to give an aggregated outcome for each class of risk, in this example an outcome for business risk, an outcome for property risk, and an outcome for general liability risk. The aggregated outcomes are aggregated together 70 to a single risk value or score (tier 2 outcome). The tier 2 outcome is then used to make the underwriting decision, such as the price of the requested insurance policy or if any policy should be issued.

An embodiment of the computer code for a risk engine of the present invention is included in Appendix A.

Figure 2:
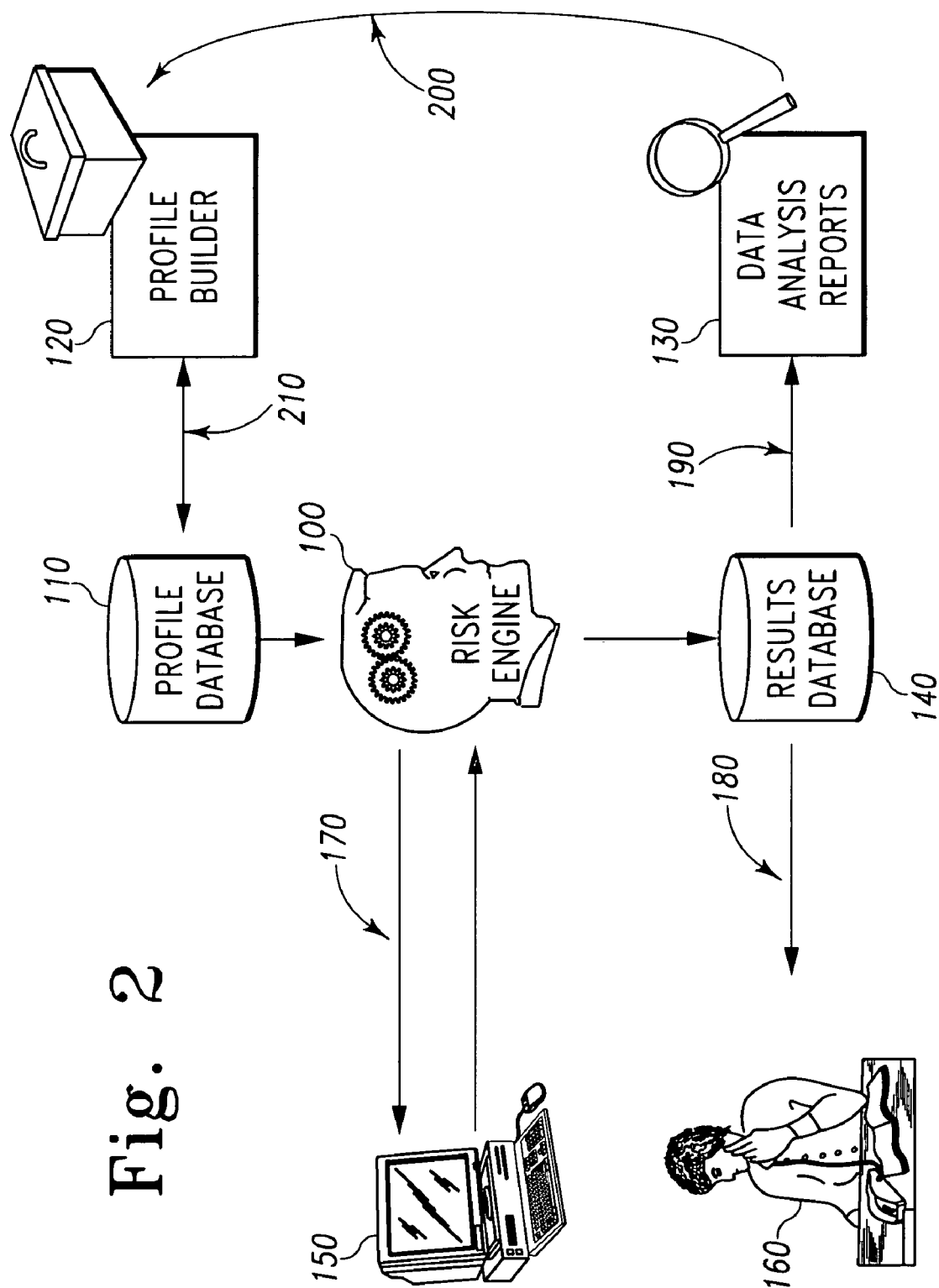
FIG. 2 illustrates an embodiment of an automated underwriting system of the present invention.

FIG. 2 illustrates an embodiment of an automated underwriting system. The risk engine 100 accepts customer data or factors via a network 170 from a user interface 150, illustrated here as a desktop computer. The risk engine accepts profiles from a profile database 110 used to make the underwriting decision, and sends the results of the underwriting decision to a results database 140 and/or back to the user via the network 170. Also illustrated is a profile builder 120 connected to the profile database via network 210, and data analysis reports 130, connected to the results database via network 190. The profile builder and the data analysis reports are connected via network 200. Finally, an underwriter 160 may have access to the results database via a network 180.

The profile builder creates and modifies profiles. Information obtained from the data analysis reports may be used to aid in the construction and modification of profiles. Network 210 connecting profile builder and the data analysis reports is optional, since a person may view the reports and use this knowledge to modify and build profiles. An embodiment of a profile builder is included in Appendix B.

The profile database stores the profiles for use by the risk engine. The profile database may be simply an electronic storage medium directly connected to the computer or server on which the risk engine is operating, for example a hard disk drive. Alternatively, the profile database my be remote from the risk engine, and connected to the risk engine via a network such as the internet.

Likewise, the results database stores the final results generated by the risk engine. The results database may be simply an electronic storage medium directly connected to the computer or server on which the risk engine is operating, for example a hard disk drive. Alternatively, the results database my be remote from the risk engine, and connected to the risk engine via a network such as the internet.

Data analysis reports may provide specific information useful for analyzing the risk engine results. The reports may be stored on an electronic storage medium, such as a hard disk drive, on a computer or server. These reports may include: case details, such as the actual values for specific underwriting fields as well as the components and profiles that match for a particular risk; gradient summaries, such as the number of items and percent of items that match each gradient outcome by component; profile details, such as the number of items and percent of items that match each profile; profile summaries, such as the number of items and percent of items that match each profile outcome; and management tracking, such as results for key metrics on underwriter reviews, overrides, actionable review, close rates, and average written premium. Optionally, these reports may be accessed via a network 200, such as the internet, by the profile builder or a user of the profile builder.

User interface 150 is illustrated as a desktop computer in FIG. 2, but may be a server connected to the internet or any network, allowing data to be transferred to and from the risk engine. Underwriter 160 may have access to the results database via a network 180, or through a telephone, or a private network through a desktop computer.

A network may be closed communications lines connecting the illustrated components, or may be a plurality of computers that communicate with each other by means of a wide-area network communications implementation, such as the internet. The network may optionally include servers.

Variations of the system shown in FIG. 2 are possible. For example, there may be multiple profile databases, optionally by different companies, allowing the risk engine to determine final underwriting decisions from each profile database. Likewise, multiple results databases are also possible. Furthermore, there may be multiple user interfaces, connected to one or more risk engines. In a preferred embodiment, the user interface is connected with one or more risk engines via the internet, allowing agents or customers to directly enter data and receive underwriting decisions. The risk engines may use scoring, neural networking, or profiling, preferably profiling, and most preferably profiling with aggregation of tier 1 profile outcomes to give tier 2 profile outcomes.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of determining risk, comprising:
   a computer segmenting case data of a single insurable customer into a plurality of components associated with a collection of profiles;
   the computer selecting a plurality of profiles from the collection of profiles that match the components associated with the collection of profiles, each of the selected profiles being representative of a respective part of the case data and an insurable dimension of the single insurable customer;
   selecting with the computer at least one of a plurality of predefined qualities for each of the components in each one of the selected profiles based on application of quality definitions to the case data segmented into each one of the respective components, the quality definitions associated with each of the selected profiles and each of the selected at least one of a plurality of predefined qualities is a term that provides a non-numeric valuation that is descriptive of the case data that is segmented into a respective one of the components within a respective one of the profiles;
   for each one of the selected profiles generating with the computer an outcome by logical combination of the predefined qualities selected for each of the components in each one of the selected profiles, the outcome of a selected profile is a pre-defined expression that is descriptive of the respective part of the case data and the insurable dimension of the single insurable customer represented with the selected profile; and the computer aggregating the outcomes from each of the selected profiles to determine the risk associated with the case data of the single insurable customer.

2. The method of claim 1, wherein the risk is the underwriting risk associated with policies selected from the group consisting of medical insurance, business owners insurance, commercial automobile insurance, workers compensation insurance, professional liability insurance, umbrella liability insurance, recreational package insurance and life insurance.

3. The method of claim 1, wherein the segmenting comprises:
matching the components to the case data by:
matching the case data with characteristics;
matching the case data and the characteristics with collectives; and
matching the case data and the characteristics and the collectives with collective-collectives.

4. The method of claim 1, further comprising receiving the case data from a network.

5. The method of claim 4, wherein the network is the internet.

6. The method of claim 5, further comprising sending data corresponding to the risk associated with the case data out over the internet.

7. The method of claim 1 further comprising sending data corresponding to the risk associated with the case data out over a network.

8. The method of claim 7, wherein the network is the internet.

9. The method of claim 1, wherein generating an outcome comprises selecting an outcome based on logical aggregation of the predefined qualities selected for each of the components with at least one of a logical AND or a logical OR.

10. The method of claim 1, wherein the risk is underwriting risk of a business owner policy.

11. The method of claim 10, wherein the collection of profiles comprises business risk profiles, property risk profiles and general liability risk profiles.

12. The method of claim 11, wherein the case data comprises data for a plurality of buildings.

13. The method of claim 11, wherein the case data comprises data for a plurality of business locations.

14. The method of claim 12, wherein the aggregating comprises:
aggregating together outcomes of selected property risk profiles, to form an aggregated property risk profile outcome;
aggregating together outcomes of selected general liability risk profiles, to form an aggregated general liability risk profile outcome; and
aggregating together outcomes of selected business risk profiles, the aggregated property risk profile outcome and the aggregated general liability risk profile outcome.

15. The method of claim 13, wherein the aggregating comprises:
aggregating together outcomes of selected property risk profiles, to form an aggregated property risk profile outcome;
aggregating together outcomes of selected general liability risk profiles, to form an aggregated general liability risk profile outcome; and
aggregating together outcomes of selected business risk profiles, the aggregated property risk profile outcome and the aggregated general liability risk profile outcome.

16. A computer program product, comprising:
a computer-readable medium,
means stored on the medium for segmenting case data into a plurality of components associated with a collection of profiles;
means stored on the medium for selecting a plurality of profiles from the collection of profiles that match the components associated with the collection of profiles, each of the selected profiles being representative of a respective part of the case data and an insurable dimension of a single insurable customer;
means stored on the medium for selecting at least one of a plurality of predefined qualities for each one of the components to describe factors included in the case data segmented into each one of the respective components by application of quality definitions to the case data segmented into each one of the respective components, the quality definitions are associated with each of the selected profiles, and the predefined qualities provide a non-numeric valuations each of which is descriptive of the case data segmented into a respective one of the components within a respective one of the profiles;
means stored on the medium for generating an outcome for each of the selected profiles based on logical combination of the predefined qualities that were selected for each one of the respective components within a respective one of the profiles, the outcome for each of the selected profiles is an expression selected from among a group of pre-defined expressions that is descriptive of the respective part of the case data and the insurable dimension of the single insurable customer represented with the selected profile; and
means stored on the medium for aggregating the outcomes of each of the selected profiles to determine a risk associated with the entirety of the case data of the single insurable customer.

17. The computer program product of claim 16, wherein the risk is the underwriting risk associated with policies selected from the group consisting of medical insurance, business owners insurance, commercial automobile insurance, workers compensation insurance, professional liability insurance, umbrella liability insurance, recreational package insurance and life insurance.

18. The computer program product of claim 16, wherein the segmenting comprises:
matching the components to the case data by:
matching the case data with characteristics;
matching the case data and the characteristics with collectives; and
matching the case data, the characteristics and the collectives with collective-collectives.

19. The computer program product of claim 16, wherein the risk is underwriting risk of a business owner policy.

20. The computer program product of claim 19, wherein the collection of profiles comprises business risk profiles, property risk profiles and general liability risk profiles.

21. The computer program product of claim 20, wherein the case data comprises data for a plurality of buildings.

22. The computer program product of claim 20, wherein the case data comprises data for a plurality of business locations.

23. The computer program product of claim 21, wherein the aggregating comprises:
aggregating together outcomes of selected property risk profiles, to form an aggregated property risk profile outcome;

aggregating together outcomes of selected general liability risk profiles, to form an aggregated general liability risk profile outcome; and aggregating together outcomes of selected business risk profiles, the aggregated property risk profile outcome and the aggregated general liability risk profile outcome.

24. The computer program product of claim 22, wherein the aggregating comprises:

aggregating together outcomes of selected property risk profiles, to form an aggregated property risk profile outcome;

aggregating together outcomes of selected general liability risk profiles, to form an aggregated general liability risk profile outcome; and aggregating together outcomes of selected business risk profiles, the aggregated property risk profile outcome and the aggregated general liability risk profile outcome.

25. The computer program product of claim 16, wherein the means stored on the medium for generating an outcome for each of the selected profiles is configured to logically combine the predefined qualities with at least one of a logical AND or a logical OR.

26. A method of evaluating insurance related business, the method comprising:

a computer segmenting data of a single insurable customer into a plurality of components that are associated with a plurality of profiles;

the computer selecting profiles from among the plurality of profiles that match the components so that each of the selected profiles are associated with one of a plurality of different insurable dimensions of the insurance related business;

the computer applying gradient definitions of respective discrete gradients for each one of the components associated with the selected profiles to the respective segmented data;

generating respective discrete gradients that are descriptive of the segmented data for each of the respective components with the computer based on the gradient definitions;

the computer logically combining two or more discrete gradients of the respective components with a logical AND or a logical OR to arrive at a discrete outcome for each of the selected profiles that is indicative of a respective one of the insurable dimensions; and the computer aggregating the discrete outcomes of each of the selected profiles to obtain a discrete result.

27. The method of claim 26, wherein multiple parts are included in at least one of the insurable dimensions and selecting profiles comprises selecting at least one profile for each of the multiple parts.

28. The method of claim 27, wherein aggregating the discrete outcomes comprises aggregating the discrete outcomes of each of the selected profiles within each of the dimensions to provide an aggregated discrete outcome of each of the dimensions in a first tier.

29. The method of claim 28, wherein aggregating the discrete outcomes comprises aggregating the aggregated discrete outcomes of each of the dimensions to form an aggregated discrete outcome in a second tier that is a score of the insurance related business.

30. The method of claim 28, wherein at least one of the dimensions includes a single part and aggregating the discrete outcome comprises aggregating the aggregated discrete outcomes of each of the dimensions in the first tier with a discrete outcome of at least one of the dimensions that includes a single part to form an aggregated discrete outcome in a second tier.

31. The method of claim 26, wherein applying gradient definitions comprises identifying, with one of the respective discrete gradients, a quality of the respective component associated with one of the profiles.

32. The method of claim 31, wherein identifying a quality comprises assigning a determined description indicative of the respective component.

33. A method of evaluating insurance related business, the method comprising:

a computer segmenting data into a plurality of components associated with a plurality of profiles as a function of the insurance related business to which the data relates;

the computer identifying different profiles that are associated with at least one of the components and are related to different dimensions of the insurance related business;

the computer applying gradient definitions associated with each of the respective components to the data segmented into a respective one of the components;

the computer generating a gradient for each of the respective components, the gradient being a non-numeric quality indication descriptive of the data segmented into each of the respective components;

the computer logically combining the non-numeric quality indications of each of the components in a respective profile to determine a first profile outcome for each of the profiles, the first profile outcome selected from among a group of predefined first profile outcomes to be a first non-numeric valuation of the data associated with the respective profile;

the computer logically combining the first profile outcomes of each of the profiles based on the different dimensions to which each of the profiles relate to determine a second outcome for each of the different dimensions of the insurance related business, wherein the second outcome is selected from among a group of predefined discrete second outcomes to be a second non-numeric valuation that is indicative of one of the dimensions; and aggregating the second outcomes of each of the dimensions to obtain an aggregated discrete third outcome representative of a third non-numeric valuation of the insurance related business.

34. The method of claim 33, wherein the aggregated discrete third non-numeric outcome is one of a plurality of aggregated discrete third outcomes for each of a plurality of classes identified within the insurance related business and the method further comprises aggregating the aggregated discrete third outcomes to obtain a discrete result selected from among a group of predefined discrete results to be conclusive of the insurance related business.

35. The method of claim 33, wherein the components comprise a collective category having at least one of collective characteristics and collective-collective characteristics in a logical relationship.

36. The method of claim 33, wherein aggregating the second outcomes to obtain an aggregated discrete third outcome comprises logically combining the second outcomes of the different dimensions classified in a class of the insurance related business.

37. The method of claim 33, wherein comparing data with a plurality of profiles comprises comparing data of a specific case to profiles associated with predetermined classes of the insurance related business.

38. The method of claim 33, wherein identifying different profiles comprises matching the profiles in different predetermined classes with the data that has been segmented into the components.

39. The method of claim 33, wherein the computer logically combining the non-numeric quality indications of each of the components in a respective profile comprises the computer logically combining the non-numeric quality indications with at least one of a logical AND or a logical OR.

40. A system for evaluation of insurance related data, the system comprising:
 a computer;
 a profile database connected to the computer, wherein the profile database includes a collection of profiles each associated with a respective plurality of components each of the components comprising gradient definitions associated with a plurality of respective variables;
 an engine executable by the computer to access the profile database, configured to segment insurance related data of a specific case into segments that are each associated with at least one of the components, and match a plurality of profiles from among the collection of profiles to the respective components into which the insurance related data of the specific case has been segmented,
 the engine further configured to identify predefined discrete gradients that are each a non-numeric valuation that is descriptive of the segment of the insurance related data associated with one of the components by logical application of the gradient definitions from the respective one of the components within the matched profiles to the segment of the insurance related data associated with the respective one of the components as a function of the respective variables,
 the engine further configured to logically combine the discrete gradients of each of the components in a respective one of the matched profiles, and select a discrete outcome for each of the matched profiles from among a group of predefined discrete outcomes,
 the engine further configured to aggregate the discrete outcomes of each of the matched profiles to form an aggregated outcome that is selected from among a group of predefined aggregated outcomes.

41. The system of claim 40, wherein the plurality of profiles is representative of one of a plurality of determined classes within the insurance related data and the engine is operable to develop an aggregated outcome for each of the determined classes.

42. The system of claim 41, wherein the engine is operable to aggregate the aggregated outcomes from each of the determined classes to form a conclusive result, whereby the conclusive result is a score that provides an evaluation of the insurance related data.

43. The system of claim 40, wherein the aggregated outcome is representative of one of a plurality of dimensions of the insurance related data.

44. The system of claim 40, wherein at least two profiles utilize a common logical association of variables.

45. The system of claim 40, further comprising a profile builder connected to the computer, wherein the profile builder is operable to create and modify profiles storable in the profile database.

46. The system of claim 45, wherein the profiles each include profile elements, and the profile builder is operable to identify a version within each of at least one of the profiles and the profile elements, wherein the version includes a start date and a stop date indicative of a time frame of applicability.

47. The system of claim 40, further comprising a results database coupled with the computer, wherein the results database is operable to store results generated by the engine.

48. The system of claim 40, wherein the engine is further configured to logically combine the discrete gradients of each of the components in a respective one of the matched profiles with at least one of a logical AND or a logical OR.

\* \* \* \* \*

UNITED STATES PATENT AND TRADEMARK OFFICE
CERTIFICATE OF CORRECTION

PATENT NO. : 7,398,218 B1
APPLICATION NO. : 09/649766
DATED : July 8, 2008
INVENTOR(S) : Michael J. Bernaski et al.

Page 1 of 1

It is certified that error appears in the above-identified patent and that said Letters Patent is hereby corrected as shown below:

Column 11
Line 52, delete "my be" and insert -- may be --.
Line 59, delete "my be" and insert -- may be --.

Column 14
Line 19, delete "a".

Column 17
Line 19, insert -- the engine -- between "database," and "configured".

Signed and Sealed this

Sixteenth Day of September, 2008

JON W. DUDAS
*Director of the United States Patent and Trademark Office*